United States Patent
Chen

(10) Patent No.: US 8,076,888 B2
(45) Date of Patent: Dec. 13, 2011

(54) METHOD FOR PROTECTING AN ELECTRONIC DEVICE DRIVEN BY DC MOTOR AND CIRCUIT FOR DETECTING POSITIONING SIGNALS THEREOF

(75) Inventor: Chi-Lun Chen, Jhubei (TW)

(73) Assignee: Yoshinaga Technologies, LLC, Willmington, DE (US)

( * ) Notice: Subject to any disclaimer, the term of this patent is extended or adjusted under 35 U.S.C. 154(b) by 0 days.

(21) Appl. No.: 12/885,347

(22) Filed: Sep. 17, 2010

(65) Prior Publication Data
US 2011/0006716 A1   Jan. 13, 2011

Related U.S. Application Data

(62) Division of application No. 11/242,699, filed on Oct. 4, 2005, now Pat. No. 7,816,882.

(30) Foreign Application Priority Data

Nov. 22, 2004 (TW) .............................. 93135911 A

(51) Int. Cl.
 *H02P 3/08* (2006.01)
(52) U.S. Cl. ........ 318/445; 318/490; 318/560; 318/638; 318/652
(58) Field of Classification Search .................. 318/445, 318/490, 560, 638, 652
See application file for complete search history.

(56) References Cited

U.S. PATENT DOCUMENTS

| | | | |
|---|---|---|---|
| 5,327,053 A | 7/1994 | Mann et al. | |
| 5,374,880 A | 12/1994 | Kondoh et al. | |
| 5,804,939 A | 9/1998 | Yamai et al. | |
| 5,872,442 A | 2/1999 | Gotou | |
| 5,877,602 A | 3/1999 | Kondoh et al. | |
| 6,081,087 A | 6/2000 | Iijima et al. | |
| 6,271,641 B1 * | 8/2001 | Yasohara et al. | 318/685 |
| 6,371,593 B1 * | 4/2002 | Li et al. | 347/19 |
| 6,534,938 B1 | 3/2003 | Wu et al. | |
| 6,768,385 B2 | 7/2004 | Smith | |
| 6,804,177 B1 | 10/2004 | Rieck et al. | |
| 6,853,161 B2 * | 2/2005 | Kobayashi et al. | 318/603 |
| 7,289,399 B2 | 10/2007 | Hiratsuka | |
| 7,816,882 B2 | 10/2010 | Chen | |
| 2001/0014922 A1 | 8/2001 | Kuge | |
| 2004/0113966 A1 | 6/2004 | Chung | |

* cited by examiner

*Primary Examiner* — Walter Benson
*Assistant Examiner* — David Luo
(74) *Attorney, Agent, or Firm* — Perkins Coie LLP

(57) ABSTRACT

A method for protecting an electronic apparatus driven by a DC motor and a detection circuit for detecting positioning signals thereof. The electronic device includes an optical encoder, a code strip, and a DC motor. While moves along the code strip, the optical encoder outputs a first positioning signal and a second positioning signal for the control of the DC motor. The method includes the steps described below. First, states of the first and second positioning signals are detected. If the states of the first and second positioning signals are normal, the DC motor is controlled according to the first and second positioning signals. If the first positioning signal or the second positioning signal is abnormal, a preventive method is performed.

12 Claims, 5 Drawing Sheets

METHOD FOR PROTECTING AN ELECTRONIC DEVICE DRIVEN BY DC MOTOR AND CIRCUIT FOR DETECTING POSITIONING SIGNALS THEREOF

CROSS-REFERENCED TO RELATED APPLICATIONS

This application is a divisional of U.S. application Ser. No. 11/242,699 filed Oct. 4, 2005, which claims the benefit of Taiwan application Serial No. 9315911, filed Nov. 22, 2004, both of which are incorporated herein by reference in their entireties.

BACKGROUND OF THE INVENTION

1. Field of the Invention

The invention relates in general to a protection method for an electronic device and a circuit for detecting positioning signals thereof, and more particularly to a protection method for an electronic device driven by a DC motor and a circuit for detecting positioning signals thereof.

2. Description of the Related Art

DC motors have been widely employed in various electronic products because motor speeds are adjustable easily and can generate a large torque. The electronic devices driven by DC motors such as printers generally utilize optical encoders in company with code strips to generate corresponding signals for the sake of controlling devices.

FIG. 1A shows a portion of a conventional printer. The printer includes a DC motor 110, a control unit (not shown), a print head 120, an optical encoder 130, and a code strip 140. Printing process is performed through the print head 120 driven by the DC motor 110 under the control of the control unit.

When the actuating DC motor 110 drives the print head 120, the optical encoder 130 disposed inside the print head 120 moves along the code strip 140, generating positioning signals A and B. For example, when the optical encoder 130 moves towards the direction pointed to by an arrow 10 under normal situation, the positioning signal A leads the positioning signal B, as shown in FIG. 1B. Conversely, when the optical encoder 130 moves towards the direction pointed to by an arrow 20 under normal situation, the positioning signal B leads the positioning signal A, as shown in FIG. 1C. The control unit controls the DC motor 110 by determining, according to the relationships between the positioning signals A and B, the direction and the distance the print head 120 is moving.

In order to avoid unexpected destructive operations of the DC motor, the control units of some electronic devices with DC motors, conventionally, would include additional protection methods. Currently, most of the protection methods determine whether the devices are in normal state according to variation of a position value which is generated by the control unit after the control unit processes the positioning signals A and B. Since these protection methods only work when the position value does not vary, such protection methods can only avoid abnormal situations due to the failure of generating signals from the optical encoder caused by the dropping of the code strip or the malfunctioning of the optical encoder. When any other situations happen where the positioning signals abnormally generated from the optical encoder, the DC motors would lose control and operates destructively, thus causing unexpected damages to the devices.

SUMMARY OF THE INVENTION

It is therefore an object of the invention to provide a protection method for an electronic device driven by a DC motor and a circuit for detecting the positioning signals thereof so that the electronic device is protected from unexpected damage by avoiding destructive operations of the DC motor due to the positioning signals generated abnormally.

The invention achieves the above-identified object by providing a detection circuit for detecting states of a first positioning signal and a second positioning signal. The detection circuit includes a rising edge detection device, a first falling edge detection device, and a comparator. The rising edge detection device is used for receiving the first and second positioning signals and outputting a first control signal, wherein when detecting a rising edge of the second positioning signal, the rising edge detection device outputs the first positioning signal as the first control signal. The first falling edge detection device is employed to receive the first and second positioning signals and output a second control signal, wherein when detecting a falling edge of the second positioning signal, the first falling edge detection device outputs the first positioning signal as the second control signal. The comparator is utilized for generating a status signal according to the first and second control signals. The status signal indicates that the first and second positioning signals are in normal states when the first and second control signals are out of phase. The status signal indicates that the first and second positioning signals are in abnormal states when the first and second control signals are in phase.

In addition, the invention achieves the above-identified object by providing a method for protecting an electronic apparatus including an encoder, a code strip, and a DC motor. While moving along the code strip, the encoder generates a first positioning signal and a second positioning signal for control of the DC motor. The method includes the following steps. First, a determination as to whether the states of the first and second positioning signals are normal is made by detecting the states of the first and second positioning signals. If the detected states of the first and second positioning signals are normal, the DC motor is controlled according to the first and second positioning signals. If the detected state of the first positioning signal or second positioning signal is abnormal, a preventive method is performed.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
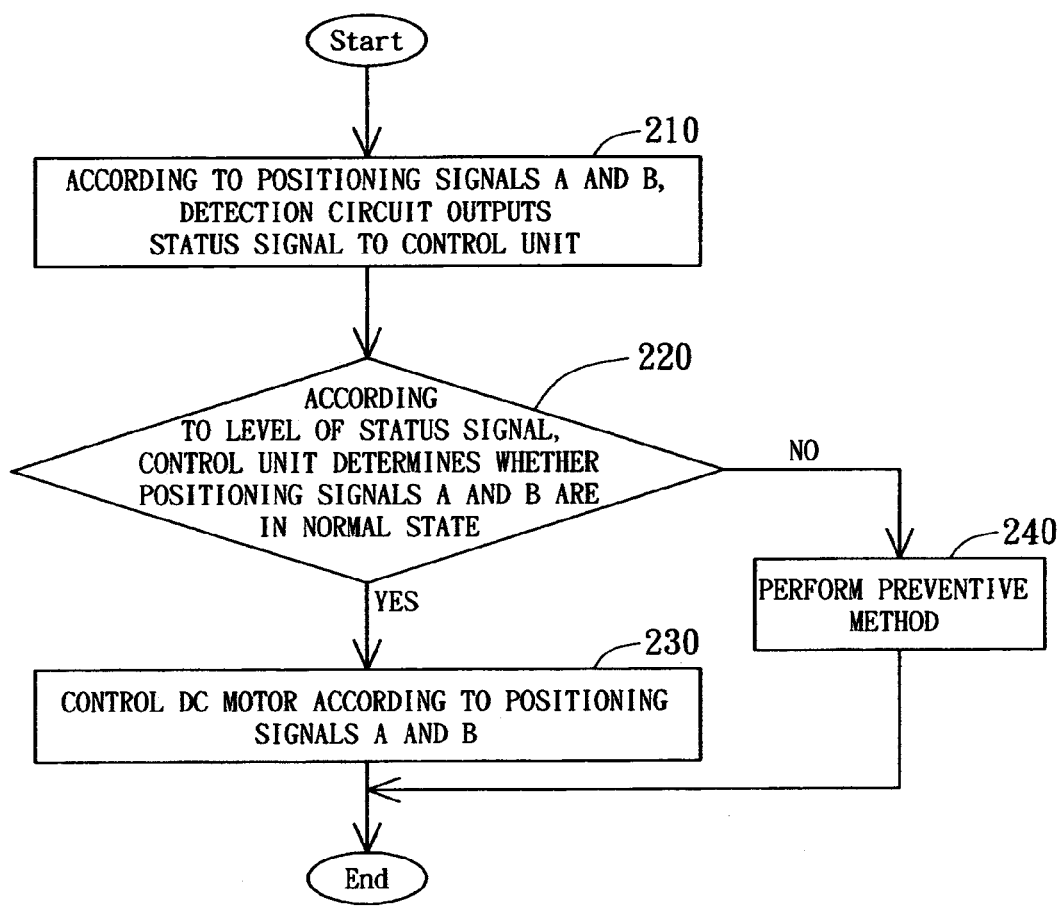
FIG. 2 is a flowchart illustrating a protection method according to a preferred embodiment of the invention.

Referring to FIG. 2, a protection method according to a preferred embodiment of the invention is shown in flowchart form. The protection method is used for protecting an electronic apparatus driven by a DC motor. The electronic apparatus, for example a printer, includes a detection circuit, preferably, in addition to an encoder, a code strip, and a DC motor. The protection method starts when the encoder moves along the code strip and generates a positioning signal A and a positioning signal B for control of the DC motor.

First, the detection circuit generates a status signal to a control unit according to the positioning signals A and B, as indicated in step 210. The generation of the status signal by the detection circuit will be explained later. Next, the control unit determines whether the states of the positioning signals A and B are normal according to the signal level of the status signal, as indicated by step 220. If the states of the positioning signals A and B are normal, the control unit controls the DC motor according to the positioning signals A and B, as in step 230. If the state of the positioning signal A or B is abnormal, the control unit performs a preventive method, as indicated in step 240. The preventive method, for example, is to reduce the speed of the DC motor or reduce the speed of the DC motor to zero, i.e. terminates the operation of the DC motor.

As above mentioned, the preventive method of the protection method according to the embodiment of the invention is performed if either the state of the positioning signal A or B is abnormal, whereby preventing the DC motor from operating destructively and damaging the electronic apparatus unexpectedly. The protection method according to the embodiment of the invention protects the electronic apparatus effectively from various abnormal situations, not only the ones where the encoder fails to generate signals due to the dropping off of the code strip or damage of the encoder, but also the ones where the encoder generates positioning signals in abnormal states due to other causes, such as the loosening of the code strip or shifting of the code strip.

The following explains the operations of how the detection circuit generates a status signal according to the positioning signals A and B according to the embodiment of the invention. Accordingly, the control unit can determine whether the states of the positioning signals A and B are normal according to the signal level of the status signal and can determine whether to perform the prevention method.

Figure 1A:
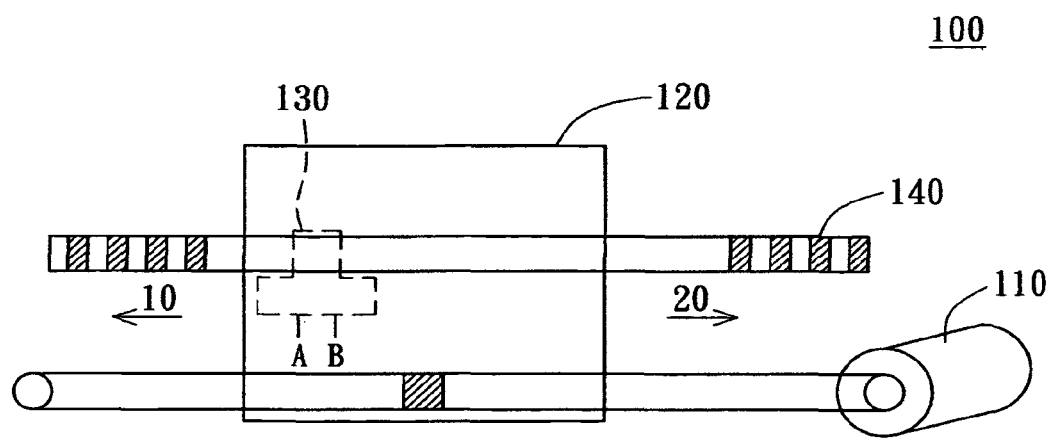
FIG. 1A (Related Art) shows a portion of a conventional printer.
Figure 1B:
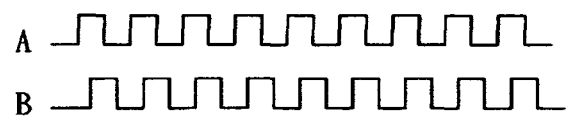
FIG. 1B (Related Art) illustrates positioning signals A and B generated during the movement of an encoder towards the direction directed by arrow 10, as shown in FIG. 1A.
Figure 1C:
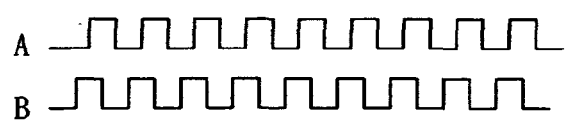
FIG. 1C (Related Art) illustrates positioning signals A and B generated during the movement of an encoder towards the direction directed by the arrow 10 shown in FIG. 1A.
Figure 3:
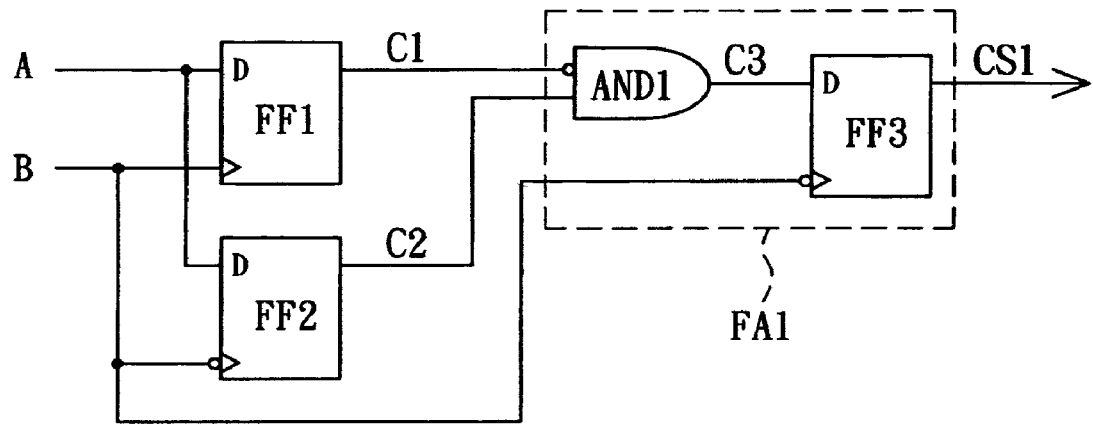
FIG. 3 is a schematic diagram showing a detection circuit according to the preferred embodiment of the invention.

Referring to FIG. 3, a detection circuit according to the preferred embodiment of the invention is shown. The detection circuit 300 is used for detecting the states of the positioning signals A and B so as to determine whether the states of them are normal and to output a status signal CS1 accordingly. The states of both the positioning signals A and B are defined as being normal in the embodiment if the positioning signal A lags behind the positioning signal B, as the relationship between the positioning signals A and B shown in FIG. 1C.

The detection circuit 300 includes a rising edge detection device FF1, a falling edge detection device FF2, and a comparator FA1. The rising edge detection device FF1 is used for receiving positioning signals A and B and generating a control signal C1, wherein when detecting a rising edge of the positioning signal B, the rising edge detection device FF1 outputs the positioning signal A as the control signal C1. The falling edge detection device FF2 is used for receiving the positioning signals A and B and generating a control signal C2, wherein when detecting a falling edge of the positioning signal B, the falling edge detection device FF2 outputs the positioning signal A as the control signal C2. The rising edge detection device FF1 and falling edge detection device FF2 can be implemented by D-type flip-flops, for example. The comparator FA1 is employed to receive the control signal C1 and control signal C2 and output the status signal CS1 according to the control signal C1 and control signal C2.

The comparator FA1 includes an AND gate AND1 and a falling edge detection device FF3. The AND gate AND1 is used for outputting a control signal C3 according to the control signal C2 and a reversed-phase signal of the control signal C1. The falling edge detection device FF3, for example, a D-type flip-flop, is employed to receive the control signal C3 and the positioning signal B and to output the status signal CS1, wherein when detecting a falling edge of the positioning signal B, the falling edge detection device FF3 outputs the control signal C3 as the status signal CS1.

Figure 4:
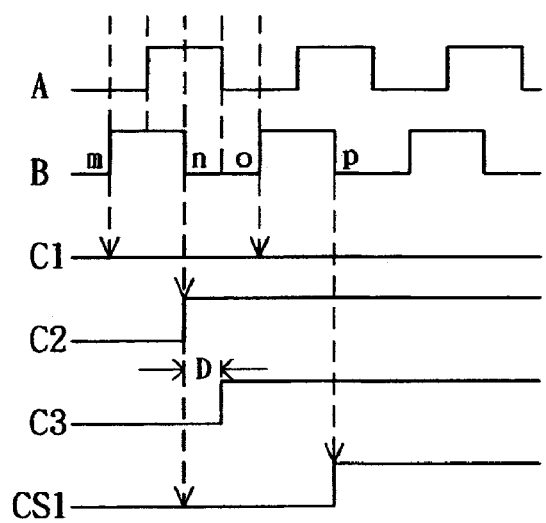
FIG. 4 is a timing diagram showing the detection of the positioning signals A and B in normal states by using the detection circuit shown in FIG. 3.

The following explains the generation of the signal levels of the status signal CS1 by the detection circuit 300 according to the positioning signals A and B in various states. Referring to FIG. 4, a timing diagram shows the detection of the positioning signals A and B in normal states by using the detection circuit shown in FIG. 3. When the detection circuit 300 detects the positioning signals A and B in normal states, the rising edge detection device FF1 is firstly triggered at the first rising edge of the positioning signal B, i.e. time m, and outputs the positioning signal A as the control signal C1, where the positioning signal is at a low level, or in a logic "0" or de-asserted state, at this time. Next, the falling edge detection device FF2 is triggered at the first falling edge of the positioning signal B, i.e. time n, and outputs the positioning signal A as the control signal C2, where the positioning signal A is at a high level, or a logic "1" or asserted state, at this time. After that, the AND gate AND1 outputs the control signal C3 after a delay time D according to the control signal C2 and the reversed-phase signal of the control signal C1, i.e. the inverted version of the control signal C1. Since the control signal C1 is at the low level and the control signal C2 is at the high level, i.e. the control signal C1 and control signal C2 being out of phase, both the control signal C2 and the reversed-phase signal of the control signal C1 are at the high level and the control signal C3 outputted by the AND gate AND1 is at the high level. The falling edge detection device FF3 is then triggered at the second falling edge of the positioning signal B, i.e. time p, and outputs the control signal C3, which is at the high level at this time, as the status signal CS1.

Figure 5:
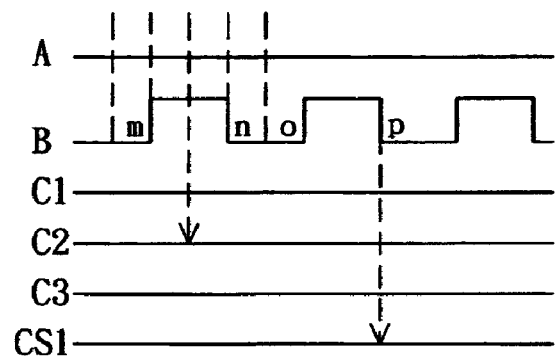
FIG. 5 is a timing diagram showing the detection of the positioning signal A in an abnormal state by using the detection circuit shown in FIG. 3.

The generation of the signal levels of the status signal CS1 by the detection circuit 300 in detecting positioning signals A and B in abnormal states is explained. Referring to FIGS. 3 and 5, FIG. 5 is a timing diagram showing the detection of the positioning signal A in an abnormal state by using the detection circuit shown in FIG. 3. In FIG. 5, the positioning signal A remains at the low level. As can be seen from FIGS. 3 and 5, although the positioning signal B is in a normal state, since the positioning signal A remains at the low level, the control signal C1 outputted by the rising edge detection device FF1 triggered at the time m and the control signal C2 outputted by the falling edge detection device FF2 triggered at the time n are both at the low level. The AND gate AND1 then outputs the control signal C3 at the low level. Therefore, when triggered at the time p, the falling edge detection device FF3 outputs the status signal CS1 at the low level.

Figure 6:
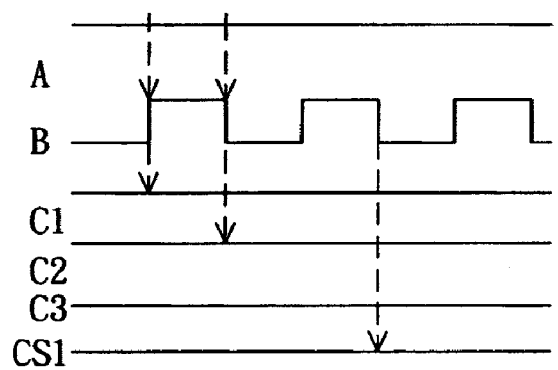
FIG. 6 is a timing diagram showing the detection of the positioning signal A in another abnormal state by using the detection circuit shown in FIG. 3.

Referring to FIG. 6, a timing diagram showing the detection of the positioning signal A in another abnormal state by using the detection circuit shown in FIG. 3 is shown. In FIG. 6, the positioning signal A remains at the high level. As can be seen from FIGS. 3 and 6, although the positioning signal B is in a normal state, since the positioning signal A remains at the high level, both the control signal C1 outputted by the rising edge detection device FF1 triggered at the time m and the control signal C2 outputted by the falling edge detection device FF2 triggered at the time n are at the high level. As such, the AND gate AND1 outputs the control signal C3 at the low level. Therefore, when triggered at the time p, the falling edge detection device FF3 outputs the status signal CS1 at the low level.

Figure 7:
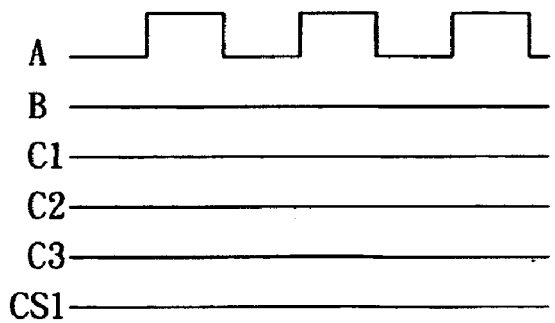
FIG. 7 is a timing diagram showing the detection of the positioning signal B in an abnormal state by using the detection circuit shown in FIG. 3.
Figure 8:
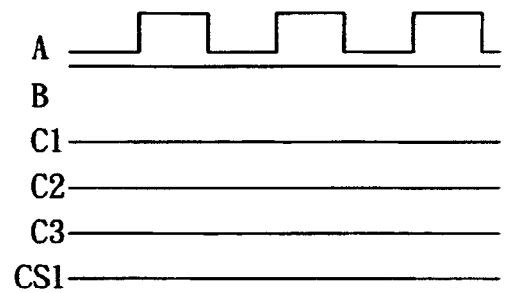
FIG. 8 is a timing diagram showing the detection of the positioning signal B in another abnormal state by using the detection circuit shown in FIG. 3.

Regarding to the detection of the positioning signal B in different abnormal states by using the detection circuit in FIG. 3, explanation is given along with timing diagrams in FIGS. 7 and 8. Further, FIG. 9 shows a timing diagram for the detection of the positioning signals A and B both in abnormal states by using the detection circuit in FIG. 3.

Figure 9:
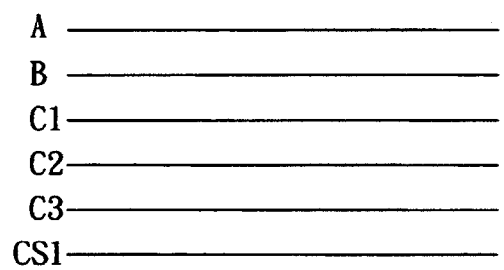
FIG. 9 is a timing diagram showing the detection of the positioning signals A and B in abnormal states by using the detection circuit shown in FIG. 3.

Since the detection circuit 300 is edge-triggered according to the embodiment, the flip-flops of the detection circuit 300 cannot be triggered when the positioning signal B is in an abnormal state, regardless of whether the positioning signal B remains at the low level, as shown in FIG. 7 or 9, or at the high level, as shown in FIG. 8. Hence, the status signal CS1 in either of FIG. 7, 8, or 9 is at the low level.

According to the above explanations, the detection circuit 300 outputs the status signal CS1 at the high level only if both the states of the positioning signals A and B are normal. Conversely, the detection circuit 300 outputs the status signal CS1 at the low level if either of the states of the positioning signal A and B is abnormal, or if both of them are abnormal. Thus, the control unit can determine whether the electronic apparatus is normal according to the status signal CS1 directly.

Further, it should be noted that the control unit might make a determination with a wrong result according to a status signal CS1 by the detection circuit 300 when the status signal CS1 varies at its initial state. In order to obtain a correct result from the determination, it is preferably for the control unit to read the status signal CS1 after a particular delay time elapses. For example, the control unit can be implemented to read the status signal CS1 after the time p and then determines whether the electronic apparatus is normal according to the status signal CS1 received after the time p. By doing so, a correct result from the determination of states of the electronic apparatus can be obtained.

Moreover, the detection circuit can be implemented with different design approaches where according to the invention, a status signal is generated according to the positioning signals A and B so that the control unit can determine whether the states of the positioning signals A and B are normal according to the status signal directly and can determine whether to perform a preventive method. For example, another detection circuit according to the preferred embodiment of the invention is shown in FIG. 10.

Figure 10:
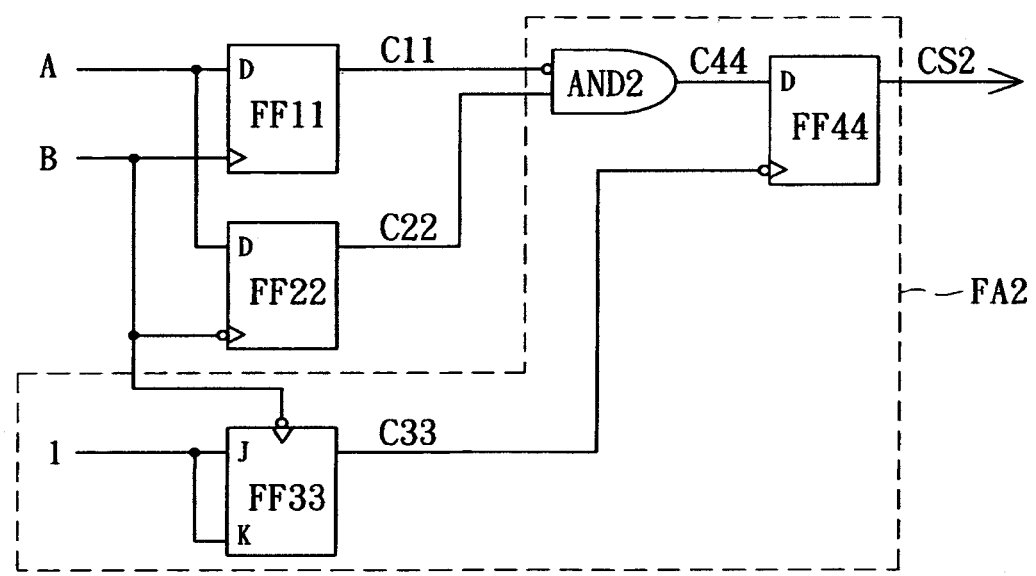
FIG. 10 is a schematic diagram showing another detection circuit according to the preferred embodiment of the invention.

As shown in FIG. 10, the detection circuit 1000 includes a rising edge detection device FF11, a falling edge detection device FF22, and a comparator FA2. As compared to the detection circuit 300 in FIG. 3, the comparator FA2 of the detection circuit 1000 in FIG. 10 includes a time delay device FF33 for delaying the detection, in addition to an AND gate AND2 and a falling edge detection device FF44, in order to make the detection correctly. The time delay device FF33 can be a J-K flip-flop, for example, having two input terminals for receiving a high level signal, or a logic "1" or an asserted signal. During a falling edge of the positioning signal B, the J-K flip-flop FF33 outputs a control signal C33. The falling edge detection device FF44 is used for receiving a control signal C44 from the AND gate AND2 and the control signal C33 and outputting a status signal CS2, wherein when detecting a falling edge of the control signal C33, the falling edge detection device FF44 outputs the control signal C44 as the status signal CS2.

According to the embodiments of the invention, the protection method for an electronic apparatus driven by a DC motor and a detection circuit for detecting the positioning signals thereof are disclosed. Accordingly, the electronic apparatus is protected from unexpected damage by avoiding destructive operations of the DC motor due to the positioning signals generated abnormally.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for protecting an electronic apparatus, the method comprising:
   providing an electronic apparatus including an encoder, a code strip, and a DC motor, wherein while moving along the code strip, the encoder generates a first positioning signal and a second positioning signal for control of the DC motor;
   generating a status signal according to the first and second positioning signals, wherein the status signal indicates whether states of the first and second positioning signals are normal by detecting whether the first and second positioning signals are out of phase;
   if the status signal indicates that the first and second positioning signals are normal, controlling the DC motor according to the first and second positioning signals; and
   if the status signal indicates that at least one of the first positioning signal or second positioning signal is abnormal, performing a preventive method.

2. The method of claim 1, further comprising:
   determining whether the states of the first and second positioning signals are normal according to a signal level of the status signal.

3. The method of claim 1 wherein the preventive method comprises reducing a speed of the DC motor.

4. The method according to claim 1 wherein protecting an electronic apparatus comprises protecting a printer.

5. The method of claim 1 wherein the preventive method comprises terminating operation of the DC motor.

6. A method for protecting an electronic apparatus, the method comprising:
- providing an electronic apparatus including an encoder, a code strip, and a DC motor, wherein while moving along the code strip, the encoder generates a first position signal and a second position signal for control of the DC motor;
- receiving the first position signal and the second position signal and outputting a first control signal, wherein when detecting a rising edge of the second position signal, the first position signal is output as the first control signal; and
- receiving the first position signal and the second position signal and outputting a second control signal, wherein when detecting a falling edge of the second position signal, the first position signal is output as the second control signal,
- controlling the DC motor according to the first and second position signals if the first and second control signals are out of phase; and
- performing a preventive method if the first and second control signals are in phase.

7. The method of claim 6 wherein receiving the first position signal and the second position signal and outputting a first control signal comprises employing a detection circuit including a rising edge detection device to receive the first position signal and the second position signal and output a first control signal, and wherein the rising edge detection device comprises a D-type flip-flop.

8. The method of claim 6 wherein receiving the first position signal and the second position signal and outputting a second control signal comprises employing a detection circuit including a falling edge detection device to receive the first position signal and the second position signal and output a second control signal, and wherein the falling edge detection device comprises a D-type flip-flop.

9. The method of claim 6 wherein performing a preventive method comprises reducing a speed of the DC motor.

10. A method, comprising:
- employing a rising edge detection device to receive a first position signal and a second position signal and output a first control signal, wherein the first and second position signals are generated by an optical encoder carried by a print head of a printer, the optical encoder being configured to move along a code strip of the printer and generate the first and second position signals for control of a DC motor of the printer, and further wherein when detecting a rising edge of the second position signal, the rising edge detection device is configured to output the first position signal as the first control signal;
- employing a falling edge detection device configured to receive the first and second position signals and output a second control signal, wherein when detecting a falling edge of the second position signal, the falling edge detection device is configured to output the first position signal as the second control signal;
- generating a status signal according to the first and second control signals, wherein a comparator is configured to generate (a) a first status signal indicating that the first position signal and the second position signal are in normal states when the first and second control signals are out of phase, and (b) a second status signal indicating that the first position signal and the second position signal are in abnormal states when the first and second control signals are in phase; and
- controlling operation of the DC motor based, at least in part, on the first and second status signals.

11. The method of claim 10 wherein controlling operation of the DC motor comprises reducing a speed of the DC motor when a control unit receives the second status signal.

12. The method of claim 10 wherein controlling operation of the DC motor comprises terminating operation of the DC motor when a control unit receives the second status signal.

* * * * *